United States Patent Office 2,839,366
Patented June 17, 1958

2,839,366

PROCESS FOR THE MANUFACTURE OF BORON NITRIDE

Jonas Kamlet, Easton, Conn., assignor to National Distillers and Chemical Corporation, a corporation of Virginia No Drawing. Application June 18, 1953
Serial No. 362,673

6 Claims. (Cl. 23—191)

This invention relates to a new and improved process for the manufacture of boron nitride (BN).

Boron nitride is usually obtained as a fine white to gray powder with a soapy or greasy feel, which can be heated to 2200° C. without appreciable decomposition in an inert atmosphere and which melts about 3000° C. It has excellent refractory material and has been proposed for use as a thermal insulator in high-frequency induction vacuum furnaces (Foster et al., Journ. Amer. Ceramic Soc. 29 (1), 27–33 (1950)), as a coating for refractory supports used in automatic welding, as a bedding material for sintering boron, as a material for the manufacture of refractory crucibles (Atomic Energy Commission Report AECO–2942) and for the lining or lip coating for crucibles. Boron nitride is a non-conductor of electricity and is used as a high temperature-stable dielectric material, as an addition to controlled semi-conductor materials. It is also an excellent lubricant with pronounced anti-sticking and anti-wetting properties and has been used as a heat-resistant lubricant (e. g. for forging or extruding dies and heated mechanical parts), as an anti-sticking agent in contact with molten glass or metals, as a mold lubricant, crucible wash and for the manufacture of ignitron ignitor tips (Finlay and Fetterley, Journ. American Ceramic Society 31, #4, 141–143 (1952); Sumner, Westinghouse Engineer, November 1947).

Heretofore, boron nitride has been manufactured by processes which may be summarized by the following equations, all of which are effected at temperatures from 400° C. to 2000° C.:

(a) $2B + N_2 \rightarrow 2BN$
(b) $BF_3 + 4NH_3 \rightarrow BN + 3NH_4BF_4$
(c) $4NH_3 + BCl_3 \rightarrow BN + 3NH_4Cl$
(d) $B_2O_3 + 2NH_3 \rightarrow 2BN + 3H_2O$
(e) $B_2O_3 + 2NH_4Cl \rightarrow 2BN + 2HCl + 3H_2O$ (Laubengayer and Condike, Journ. Amer. Chem. Soc. 70, 2274–76 (1948); Heyder, Journ. Soc. Chem. Ind. 32, 600 (1913); British Thomson-Houston Co., British Patent 483,201 (1938); Podzus, Zeit. Angav. Chem. 30, 156 (1917); German Patents 282,701 and 282,748).

An excellent process for the manufacture of boron nitride has been described by Weintraub in U. S. Patent 1,135,232 of 1915. A compound of boron (such as boric anhydride or borax) is heated with an alkali metal cyanide to a temperature of about 2000° C. The following reactions are believed to occur.

$$B_2O_3 + 2NaCN \rightarrow 2BN + Na_2CO_3 + C$$
$$B_2O_3 + 2NaCN \rightarrow 2BN + Na_2O + 2CO$$

The reaction temperature of 2000° C. is high enough to cause all of the above by-products of the reaction to boil or sublime away, leaving a residue of boron nitride which melts at 3000° C. This process is simple and ideally suited for the manufacture of small batches of boron nitride. However, on a larger commercial scale, the sublimation or boiling away of comparatively large amounts of highly corrosive by-products of the reaction causes an almost insuperable difficulty. The furnace rapidly becomes clogged and corroded. The explosion hazard is severe and dangerous and the problem of fume disposal is a serious deterrent to any large scale development of this process. The sodium monoxide formed as a by-product of the reaction commences to decompose at temperatures above 400° C. to form sodium peroxide and elemental sodium, a mixture which is highly explosive in the sublimed or gaseous state at the temperatures of the reaction furnace, i. e. about 2000° C.

In my preliminary work, I have found that the reaction of $B_2O_3$ with NaCN (or KCN) proceeds with the formation of satisfactory yields of boron nitride at temperatures of 800° C. to 1500° C., which range is below the sublimation temperatures or boiling points of the by-products of the process. Thus, at the conclusion of the reaction, a mixture is obtained consisting of boron nitride with varying amounts of sodium oxide, sodium carbonate, unreacted sodium cyanide, some sodium borate, etc. If an attempt is then made to comminute the cooled and solidified reaction product and separate the water-soluble by-products from the insoluble boron nitride, the strongly alkaline by-products will react with and hydrolyze the boron nitride, e. g.:

$$Na_2O + 2BN + 3H_2O \rightarrow 2NaBO_2 + 2NH_3$$

with a resultant marked diminution of yields of boron nitride. Similarly, extraction of the cooled comminuted reaction product with acid solutions also causes losses of BN by hydrolytic decomposition, e. g.:

$$2BN + 6H_2O + 2HCl \rightarrow 2NH_4Cl + 2H_3BO_3$$

The basis of this invention is the finding that good yields of boron nitride may be obtained by the following sequence of reactions:

(a) Two moles of a member of the group consisting of sodium cyanide and potassium cyanide are heated with from two to five moles of boric anhydride at temperatures between 800° C. and 1500° C. The overall reactions involved may be given by the following equations:

$$2NaCN + 2B_2O_3 \rightarrow 2BN + Na_2B_2O_4 + 2CO$$
$$2NaCN + 3B_2O_3 \rightarrow 2BN + Na_2B_4O_7 + 2CO$$
$$2NaCN + 4B_2O_3 \rightarrow 2BN + Na_2B_6O_{10} + 2CO$$
$$2NaCN + 5B_2O_3 \rightarrow 2BN + Na_2B_8O_{13} + 2CO$$

(b) The reaction mixture, after the evolution of carbon monoxide has ceased and the formation of boron nitride is completed, is cooled, comminuted and extracted with hot water. The substantially neutral or mildly alkaline sodium borates are separated from the insoluble boron nitride without causing the alkaline hydrolysis of the latter.

(c) Because of the extremely fine state of subdivision and retentiveness of the boron nitride thus obtained, it is finally necessary to stabilize the boron nitride by firing or sintering the product at a temperature of 1900° C. to 2200° C. in an inert atmosphere (nitrogen, carbon dioxide, argon, etc.). This final treatment serves to sublime off or boil away traces of mechanically occluded alkali metal salts which deleteriously effect the stability of the boron nitride. The stability of the boron nitride stabilized by firing, sintering or calcining at 1900°–2200° C. is very markedly increased, so that the product so stabilized will be only very slowly attacked by aqueous alkalies and aqueous acids whereas the unstabilized boron nitride is quite readily attacked by these reagents.

The rationale of employing from 2 to 5 moles of $B_2O_3$ per two moles of NaCN (or KCN) in the first step of my new process may be explained as follows. Weintraub in U. S. Patent 1,135,232 employs one mole of $B_2O_3$ per two moles of NaCN (or KCN) and derives a mixture of boron nitride and a highly alkaline mixture of sodium oxide and sodium carbonate (see the equations above), which cannot be separated by aqueous extraction because the strong alkali decomposes the boron nitride by alkaline hydrolysis, as described above.

I have found that the use of from 2 to 5 moles of $B_2O_3$ per two moles of NaCN (or KCN) in the first step of this process obviates this difficulty altogether. I obtain a mixture of boron nitride and a sodium borate which, on solution in water, is substantially neutral or so mildly alkaline that little or no alkaline hydrolysis of the boron nitride occurs. This permits an easy separation of the insoluble boron nitride as, for instance, by filtration.

The first step of this process may be effected by mixing two moles of NaCN (or KCN) with one mole of $B_2O_3$, heating the mixture in a crucible of suitable construction (e. g. graphite) at 800° to 1500° C. until the evolution of carbon monoxide is complete, and thereafter adding a further one to four moles of $B_2O_3$ to the reaction mixture to obtain a melt containing boron nitride and sodium borates. Alternately, it may be effected by initially mixing two moles of NaCN (or KCN) with two to five moles of $B_2O_3$ and heating the mixture at 800° to 1500° S. to obtain a melt of boron nitride and sodium borates. Sodium metaborate (diborate) and sodium tetraborate (borax) form discrete crystalline compounds whereas a continuous series of solid solutions are obtained between sodium tetraborate and sodium octaborate (Ponomarey, Zeit. anorg. Chem. 89, 383 (1814); Soubeiran and Pellerin, Journ. Pharm. Chem. (2) 14, 170 (1828); Gernez, Comptes rendus 78, 68 (1857); Payen, Journ. Chem. Med. (1) 3, 594 (1827), ibid 4, 153 (1828), Quart. Journ. Science 25, 483 (1828); Richards & Churchill, Zeit, phys. Chem. 28, 314 (1899).

At the conclusion of the reaction, the melt is cooled, solidified and comminuted. The comminuted material is then extracted with water, preferably with boiling water. The insoluble boron nitride may then be separated (e. g. by filtration) from the aqueous solution of sodium borate thus obtained. The sodium borate solution may then be processed for the recovery of crystalline sodium metaborate, borax, boric acid or boric anhydride.

The boron nitride thus obtained is then stabilized by firing or sintering in an inert atmosphere (e. g. nitrogen, carbon dioxide or argon) at temperatures between 1900° C. and 2200° C., for periods of from 15 minutes to two hours, at atmospheric or super-atmospheric pressure. The product so stabilized is a white powder consisting of hexagonal plates with a graphitic cleavage with an apparent density of from 100 to 110 grams per liter, melting above 3000° C.

The yields of stabilized boron nitride obtained by this process vary from 40% to 55% of the theoretical, and the process is applicable to operation on the largest commercial scale. The best yield I have been able to obtain by the Weintraub process (U. S. Patent 1,135,232) on a laboratory scale only was 22% of the theoretical.

The following examples are given to define and to illustrate this invention but in no ways to limit it to reagents, proportions or conditions described therein. Obvious modifications will occur to all persons skilled in the art. All parts given are parts by weight.

*Example 1*

210 parts of boric anhydride (3 moles) and 100 parts of sodium cyanide (2 moles) are ground together, charged into a graphite crucible and heated in an electric furnace at a temperature of 800° C. to 1500° C. until evolution of carbon monoxide has ceased and a uniform melt is obtained (one to three hours). The melt is then poured onto a flat surface, allowed to solidify and is then ground to a fineness of 60 to 100 mesh. The powdered material is extracted with four portions of 1000 parts of boiling water. The insoluble boron nitride is filtered from the aqueous solution. The combined filtrates are then processed for the recovery of borax or other boron compounds.

The filter cake is stabilized by firing in an electric furnace, in a nitrogen atmosphere, at a temperature of about 2000° C. for an hour. There is thus obtained a yield of 25.1 parts of stabilized boron nitride, equivalent to a yield of 50.6% of the theoretical.

*Example 2*

70 parts of boric anhydride (1 mole) and 132 parts of potassium cyanide (2 moles) are ground together, charged into a graphite crucible and heated in an electric furnace at a temprature of 800° C. to 1500° C. until evolution of carbon monoxide has ceased. A further portion of 70 parts of boric anhydride (1 mole) is added to the crucible, and the mixture is heated at 1000°–1500° C. until a uniform melt is obtained (one to two hours). The melt is then poured onto a flat surface, allowed to solidify and is then ground to a fineness of 60 to 100 mesh. The powdered material is extracted with four portions of 1000 parts of boiling water. The insoluble boron nitride is then filtered from the aqueous solution. The combined filtrates are then processed for the recovery of potassium metaborate or other boron compounds.

The filter cake is stabilized by firing in an electric furnace, in a carbon dioxide atmosphere, at a temperature of about 2000° C. for ninety minutes. There is thus obtained a yield of 23.5 parts of stabilized boron nitride, equivalent to a yield of 47.6% of the theoretical.

Having described my invention, what I claim and desire to protect by Letters Patent is:

1. A process for the manufacture of boron nitride which comprises the steps of reacting from two to five moles of boric anhydride with two moles of a member of the group of alkali metal cyanides consisting of sodium cyanide and potassium cyanide, at temperatures between 800° C. and 1500° C., until evolution of carbon monoxide is substantially complete, thereafter cooling, solidifying and comminuting the solidified reaction mixture, thereafter separating the water-insoluble boron nitride from the water-soluble alkali metal borates and thereafter stabilizing the boron nitrides by heating at a temperature of from 1900° C. to 2200° C.

2. The process described in claim 1 where one mole of boric anhydride is reacted with two moles of a member of the group of alkali metal cyanides consisting of sodium cyanide and potassium cyanide, at temperatures between 800° C. and 1500° C., until evolution of carbon monoxide is substantially complete, and thereafter adding to the reaction mixture from one to four additional moles of boric anhydride to obtain a melt of boron nitride and alkali metal borates.

3. The process described in claim 1 where the boron nitride is recovered from the reaction mixture containing the same in admixture with alkali metal borates by cooling and solidifying the reaction mixture and extracting the water soluble alkali metal borates therefrom with water, leaving a residue of water-insoluble boron nitride.

4. The process described in claim 1 where two moles of sodium cyanide is reacted with from two to five moles of boric anhydride at temperatures between 800° C. and 1500° C.

5. The process described in claim 1 where two moles of potassium cyanide is reacted with from two to five moles of boric anhydride at temperatures between 800° C. and 1500° C.

6. The process described in claim 1 where the boron nitride is stabilized by heating in a carbon dioxide atmosphere at tempeartures between 1900° C. and 2200° C.

References Cited in the file of this patent

UNITED STATES PATENTS

| | | |
|---|---|---|
| 1,077,712 | Heyder | Nov. 4, 1913 |
| 1,135,232 | Weintraub | Apr. 13, 1915 |
| 1,157,271 | Weintraub | Oct. 19, 1915 |

FOREIGN PATENTS

| | | |
|---|---|---|
| 483,201 | Great Britain | Apr. 13, 1938 |

OTHER REFERENCES

Tiede et al.: "Berichte," volume 53, page 2208 (1920).